United States Patent [19]

Belasco

[11] Patent Number: 4,731,186

[45] Date of Patent: Mar. 15, 1988

[54] MAGNETIC FLUID TREATING METHOD AND DEVICE

[76] Inventor: David Belasco, 10702 Rhonda Ave., Garden Grove, Calif. 92643

[21] Appl. No.: 783,411

[22] Filed: Oct. 3, 1985

[51] Int. Cl.[4] .......................... C02F 1/48; B01D 35/06
[52] U.S. Cl. ..................... 210/695; 210/223; 210/416.2; 210/440; 55/3; 55/100
[58] Field of Search ............... 55/100, 2, 3; 210/222, 210/223, 695, 416, 2, 440; 209/214, 232

[56] References Cited

U.S. PATENT DOCUMENTS

| | | | |
|---|---|---|---|
| 2,800,230 | 7/1957 | Thoma | 210/223 |
| 3,202,287 | 8/1965 | Szwargulski | 210/223 |
| 3,224,583 | 12/1965 | Rosaen | 210/223 |
| 3,468,420 | 9/1969 | Rosaen | 210/223 |
| 3,762,135 | 10/1973 | Ikebe et al. | 210/223 X |
| 4,450,075 | 5/1984 | Krow | 210/223 |

Primary Examiner—Richard V. Fisher
Assistant Examiner—W. Gary Jones
Attorney, Agent, or Firm—Whann & Connors

[57] ABSTRACT

Disclosed is a device for treating a fluid to remove particles from the fluid and condition it so that scale is not formed on the piping or other structure carrying the fluid. A magnetic conditioning assembly and filter are disposed in a circulating system with the filter being upstream of the magnetic conditioner so that iron particulates are removed prior to accumulating on the surface of the conditioner. These iron particles are thus prevented from interfering with the function of the conditioner. The conditioner treats the water so that scale formation is reduced or eliminated and also prevents or reduces the formation of scale upon the filter element.

8 Claims, 5 Drawing Figures

MAGNETIC FLUID TREATING METHOD AND DEVICE

BACKGROUND OF THE INVENTION

1. Field of the Invention

This invention relates to a device for treating fluids, particularly for preventing scale build-up in a system for circulating fluids and for removing particulates from the fluid.

2. Background Discussion

In U.S. Pat. No. 4,428,837, there is disclosed a magnetic conditioner device which is used to treat fluids, for example, water, which may contain dissolved minerals such as calcium, and which, under certain conditions, will nucleate on the walls of the systems carrying the fluid to form scale. This is particularly undesirable in water heating or cooling systems where the scale acts as an insulating barrier between the heat transfer elements and the water. This scale must be removed periodically by abrasion or acid treatment, or the scaled component must be replaced.

Magnetic conditioners comprise an array of magnets contained within a tubular member. These magnetics are spaced apart by spacers. As the water flows past the magnets, water encapsulated seed particles are liberated to provide sites for crystalization of the dissolved minerals. When this occurs, the dissolved minerals crystalize on the liberated seed particles and remain in suspension to be carried out of the system rather than forming a scale on the walls of the tubing.

One problem with the use of magnetic conditioners is that iron particles carried by water are attracted to the conditioners surface. As iron builds up on the surface, the magnetic field is altered and this eventually prevents the conditioner from operating effectively. Thus, the conditioner must be removed from the system and cleaned to remove the iron particles adhering to its surface.

THE INVENTION

The present invention provides a unique combination of a magnetic conditioner and a filter. This combination provides several advantages. First, this combination of conditioner and filter is easy to assemble, easy to clean, and easy to maintain. Secondly, it eliminates the problem of iron particulate build-up on the surface of the magnetic conditioner. Thirdly, the combination of conditioner and filter in a system where water is continuously recirculated eliminates, or substantially reduces, the formation of mineral scale on the filter media. This third advantage thus enables the invention to be used in such recirculating systems as swimming pools, spas and the like. Presently in such systems, the filter cartridge employed must be periodically removed and dipped into acidic solution in order to rid the filter of scale build-up.

This invention is a combination of a magnetic conditioner and filter with the filter being upstream of the conditioner so that iron particulates are trapped in the filter prior to coming in the vicinity of the conditioner. Thus, the problem associated with iron particulates adhering to the conditioner's surface is eliminated. In one embodiment of this invention, the conditioner and filter are both contained within the same housing, with the filter and conditioner being co-axillary aligned. The magnetic conditioner comprises a hollow tubular member of non-magnetic material in which are disposed a plurality of magnets variably spaced apart by nonmagnetic spacers. The number of magnets, spacing distance, and the strength and size of the magnets are determined by the conditions in which it is to be used. The fluid velocity, cross-sectional area of the fluid flow path, and size and pattern of magnets are adjusted to eliminate or minimize the formation of scale within the system using the conditioner. The filter may be of the conventional cartridge type, being in the form of a tubular element, with its ends sealed off. The magnetic conditioner simply fits telescopically into the hollow central core of the filter.

In the preferred embodiment of this invention, the filter and conditioner are contained in a canister-type housing which has an elongated bottom section which is closed off and sealed by a removable top section having fluid inlet and outlet means therein. There is provided a baffle member which is disposed within the bottom section of the housing and includes a cylindrical wall element which surrounds the magnetic conditioner and directs the flow of fluid past the conditioner so that the fluid flows generally parallel to the longitudinal axis of the conditioner. Water first flows into the housing, down the outside of the cylindrical wall of the baffle, then underneath it, to flow past the conditioner in an upwardly direction and then out the outlet means. Depending upon the cross-sectional diameter of the filter element, the baffle will be either surround both the filter element and the conditioner, or simply surround the conditioner element with the filter element being on the exterior of the baffle. Thus, with larger diameter devices employing filters having an inside diameter in excess of about two inches, the baffle will be disposed between the filter and conditioner. For smaller diameter devices of less than about two inches, the baffle will surround both the filter element and the conditioner.

BRIEF DESCRIPTION OF THE DRAWING

The features of the present invention can best be understood, together with its advantages, by reference to the following description taken in connection with the drawing where like numerals indicate like parts.

DESCRIPTION OF THE PREFERRED EMBODIMENTS

Figure 1:
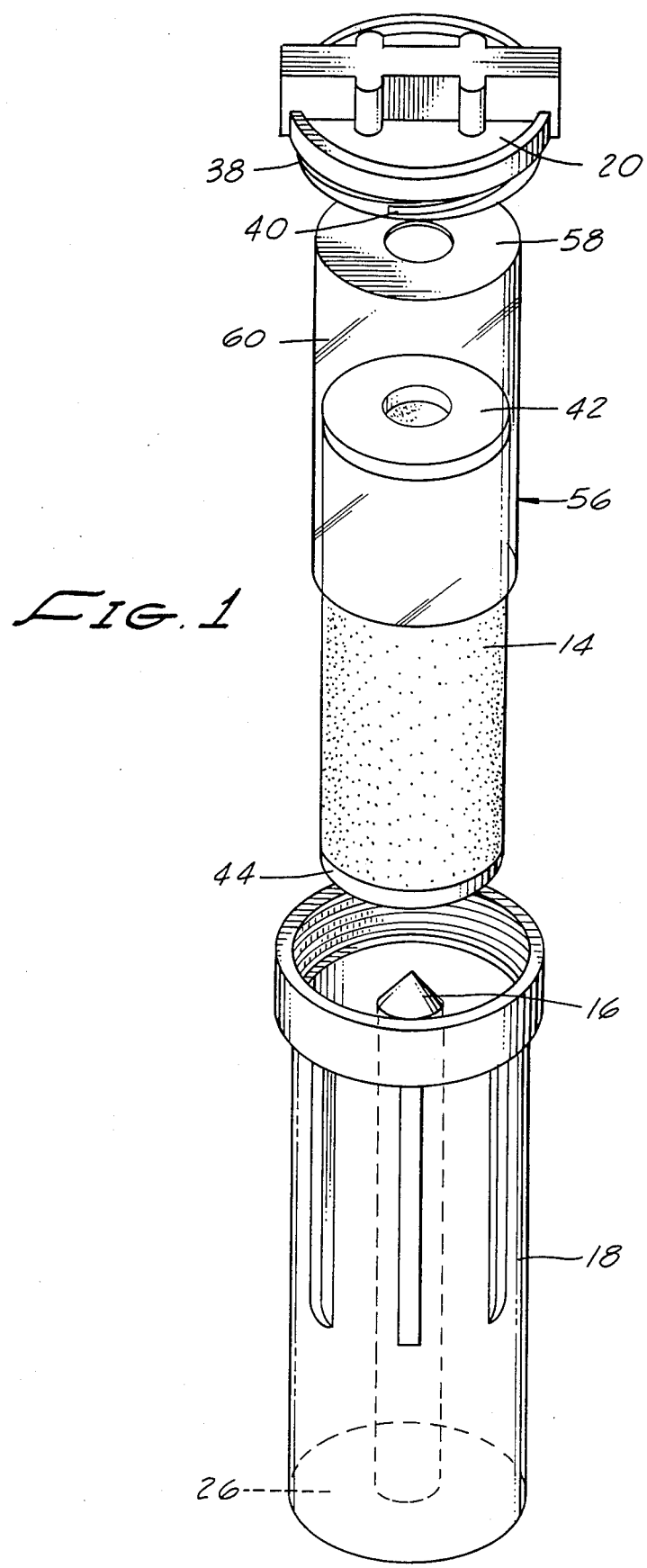
FIG. 1 is an exploded perspective of the device of this invention.
Figure 2:
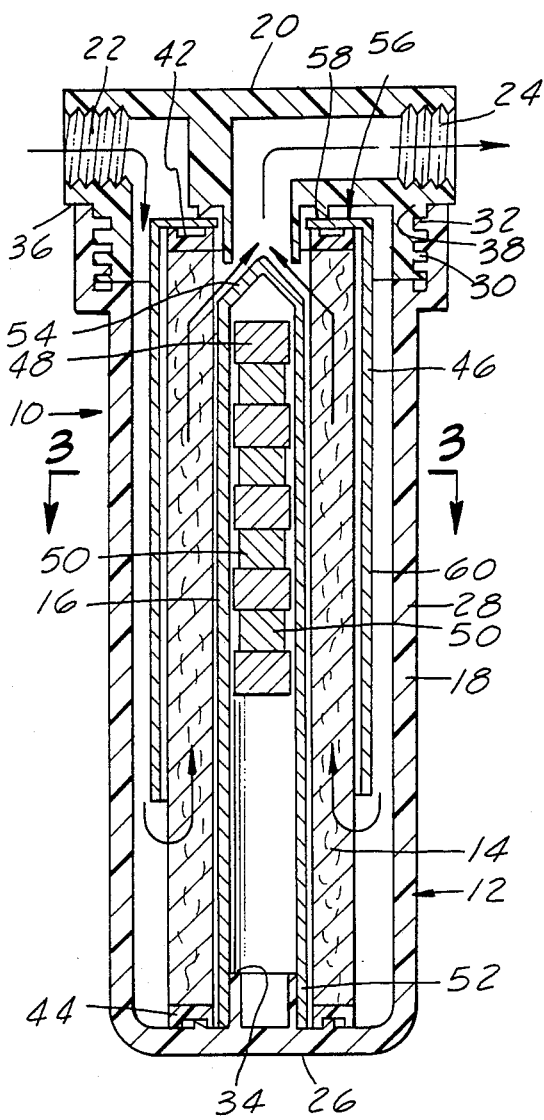
FIG. 2 is a cross-sectional view of the device of this invention.
Figure 3:
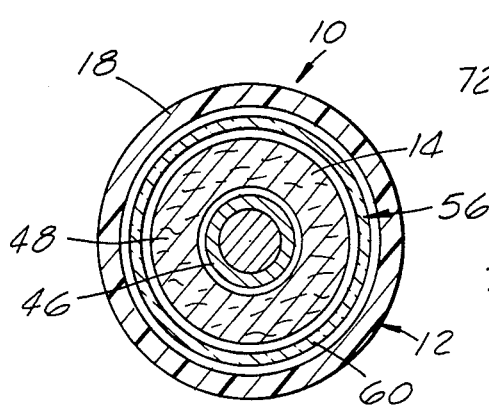
FIG. 3 is a cross-sectional view of the device of this invention taken along line 3—3 of FIG. 2.

As shown in FIGS. 1 and 2, the device 10 of this invention includes three major components: a housing 12, a filter 14, and a magnetic conditioning assembly 16. The housing 12 is of the canister type having an elongated bottom 18 and a removable top containing fluid inlet and outlet channels 22 and 24 therein. The bottom 18 section has a circular base 26 with an upwardly projecting sidewall 28 that terminates at its upper end in a threaded lip 30 with the threads 32 being on the inside of the lip. In the base is a raised annular piece 34 which serves to locate the filter 14 and conditioner 16 in position. The top 20 and the bottom 18 are both molded from plastic and may be made by injection molding techniques. The top 20 has a stepped portion which includes a ring element 38 having on its exterior surface threads 40 which mesh with and mate with the threads 32 on the lip 30 of the bottom 18 when the top is screwed into position.

The filter is of the conventional cartridge type and it has the geometrical shape of a thick walled hollow cylinder with the ends of the cylinder being sealed off by seals 42 and 44. The filter's porosity is selected to trap particle sizes present in the system using the device 10, thus preventing accumulation of iron particles on the surface of the assembly 16 that may interfere with the operation of this assembly by altering its flux density pattern. The outside diameter of the filter may vary over a wide range, for example, from about 3 inches to about 18 inches inches. Also, the length of the filter may vary over a wide range, for example, from about 3 inches to about 30 inches. The filter 14 nestles around the assembly 16 and sits on the base 26 of the housing 18 in a stationary position.

The magnetic conditioning assembly 16 consists of a tubular member 46 made of a non-magnetic material in which are contained a series of vertically spaced apart magnets 48. Spacers 50 made of a non-magnetic material such as plastic are used to separate the magnets and a potting resin is used to secure the magnets and spacers in a permanent position within the tubular member 46. The tubular member 46 has an open bottom end 52 which in one embodiment enables it to be located on the raised annular piece 34 in the base 26 of the bottom 18 of the housing. The opposed top end 54 of the tubular member 46 is closed. This tubular member 46 is positioned so that its co-axial with the filter cartridge 14 and aligned so that it's axis is co-extensive with the longitudinal axis of the housing.

In accordance with one feature of this invention, a baffle 56 is used to direct the flow of fluid past the magnetic conditioning assembly 16 so that the fluid flows along a course which is generally parallel to the axis of the assembly. This baffle 56 includes a cap 58 and a downwardly extending wall 60. The baffle wall 60 is generally cylindrical with its upper section being secured to the wall by means such as adhesive. There is a central opening in the cap 58 into which the influent end of the outlet channel 24 extends. The baffle wall 60 extends downwardly into the lower portion of the bottom 18 terminating at a point below the array of magnets in the magnetic conditioning assembly 16. This insures that all the water will flow past the conditioning assembly 16.

In accordance with another feature of this invention, the device 10 is easy to assemble and disassemble. To assemble the device 10, one simply places the magnetic conditioner assembly 16 into the bottom 18 of the housing 12 so that it is seated on the raised annular piece 34. Then one slips the filter cartridge is 14 over the conditioning assembly 16, and next places the baffle 56 over the filter cartridge so that it rests on the upper end of the cartridge, with the cap 56 covering and resting on the upper seal 42 of the filter 14. Finally, the top 20 is screwed into position to put a downward pressure on the assembly of the baffle 56 and filter 14, sealing the housing 12, so that the fluid flowing into the device 10, first flows through the filter 14 and then past the conditioning assembly 16 out the outlet channel 24. To disassemble, one simply unscrews the top 20 and removes the baffle, filter and assembly.

Figure 4:
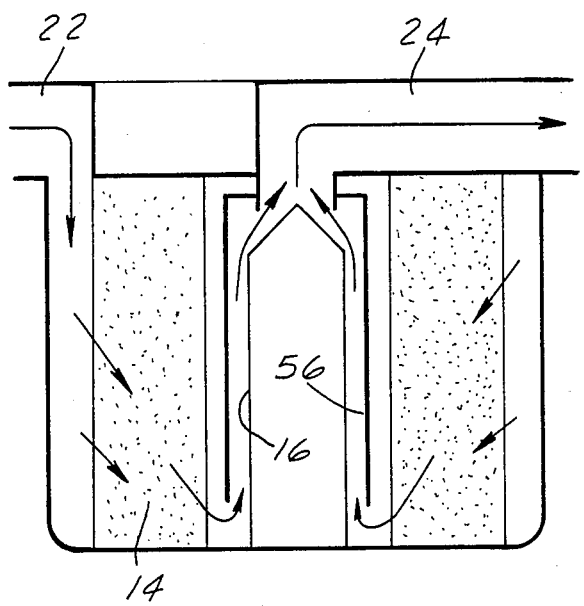
FIG. 4 is a schematic view in cross section illustrating an alternate embodiment of the device of this invention.

As illustrated in FIG. 4, the device of this invention could be used with larger diameter filters. In such case, the baffle 56 is located on the inside of the filter 14 rather than on the outside, as illustrated in FIG. 2. The embodiment shown in FIG. 4 is essentially the same as that shown in FIG. 2, except that the filter 14 is now surrounding the baffle 56 rather than the baffle surrounding the cartridge.

Figure 5:
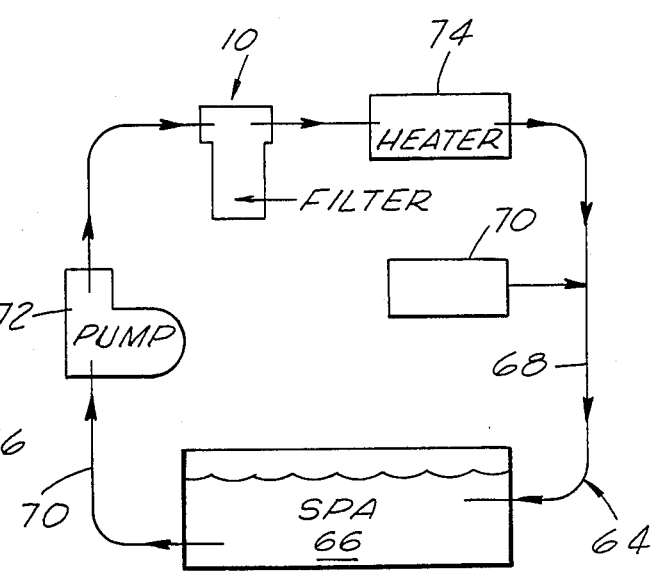
FIG. 5 view is a schematic diagram illustrating the use of this device in a recirculating water system.

As illustrated in FIG. 5, the device 10 of this invention may be used in a fluid circulating system 64 such as employed in a swimming pool or spa 66. In this system, water is pumped by a pump 72 from the spa 66, flowing through line 70 and the pump 72, first through the filter 14 and then past the conditioning assembly 16 into and through the heater 74. This is simply accomplished by connecting the line 70 to the inlet channel 22 and the outlet channel 24 to the influent end of the heater 74. The effluent end of the heater 74 is connected by line 68 to the spa 66, with make-up water from source 70 as required. In such a system 64, scale would ordinarily tend to form on the filter 14, as well as within the heater 74. But, because of the magnetic conditioning assembly 16, this scale formation is eliminated or reduced. Thus, the life of the filter 14 is lengthened substantially Also, because of the elimination of particulates, especially iron particulates, the magnetic conditioner assembly 16 is able to function for a substantial period of time without maintenance, and is easily removed if it should ever be required. Thus, the combination of filter 14 and conditioner 16 disposed directly in line, as illustrated in FIG. 5, provide a synergistic effect resulting in the enhanced utility, ease of maintenance, and prolonged life of the filter 14, the magnetic conditioner assembly 16 and the heater 74.

SCOPE OF THE INVENTION

The above description presents the best mode contemplated of carrying out the present invention as depicted by the embodiments disclosed. The combination of features illustrated in these embodiments provide the advantages of this invention. This invention is, however, susceptible to modifications and alternate constructions from the embodiments shown in the drawing and described above. Consequently, it is not the intention to limit to the particular embodiments disclosed. On the contrary, the intention is to cover all modifications and alternate constructions falling within the scope of the invention is generally expressed by the following claims.

What is claimed is:

1. A method of conditioning water and removing magnetic particles therefrom, comprising
providing a magnetic conditioning assembly and directing the water to flow past the assembly in a predetermined manner to condition the water, and
prior to passing the water past the assembly, filtering the water to remove magnetic particles therefrom,
said magnetic conditioning assembly comprising
(a) an elongated housing having an inlet into which the water flows and an outlet from which conditioned water exits,
(b) a plurality of spaced magnets sealed within a non-magnetic tubular member which is disposed along the longitudinal axis of the housing, said magnets being arranged to provide an effective conditioning field,
(c) baffle means within the housing for directing the flow of water past the magnets, said baffle means including a solid wall element which surrounds the row of magnets, is generally parallel to the longitudinal axis of the housing, and has an opening therein upstream of the effective conditioning field so that substantially all the water flows through said opening and past the magnets generally parallel to the longitudinal axis of the assembly between said tubular member and the baffle wall.

2. A device for conditioning fluid and removing particles therefrom, comprising an elongated housing having an inlet into which the fluid flows and an outlet from which conditioned fluid exits, a magnetic conditioning assembly, including a plurality of spaced magnets sealed within a non-magnetic tubular member which is disposed along the longitudinal axis of the housing, said magnets being aligned in a row to provide an effective conditioning field, a tubular filter element within the housing and surrounding the magnetic conditioning assembly, said element being co-axial with the assembly and extending substantially along the entire length of the assembly, and baffle means within the housing for directing the flow of fluid past the magnetic conditioning assembly, said baffle means including a solid wall element which surrounds the row of magnets of the magnetic conditioning assembly, is generally parallel to the longitudinal axis of the housing, and has an opening therein that is upstream of the effective conditioning field so that substantially all the fluid flows through said opening and through said field generally parallel to the longitudinal axis of said assembly between the said tubular member and the baffle wall.

3. The device of claim 2, wherein the housing has a removable closure member in which are located the inlet and outlet.

4. The device of claim 3 wherein the wall element is cylindrical and it surrounds the row of magnets of the magnetic conditioning assembly and the filter element.

5. The device of claim 3 wherein the solid wall element is cylindrical and is disposed between the filter element and the magnetic conditioning assembly and surrounds the magnetic conditioning assembly.

6. A device for conditioning a fluid and removing particles therefrom, comprising a housing having an elongated bottom section and a removable top section covering the bottom section and sealing it, said top section having fluid inlet and fluid outlet means therein, a magnetic conditioning assembly, including a plurality of spaced magnets sealed within a non-magnetic tubular member which is disposed along the longitudinal axis of the bottom section of the housing, said magnets being arranged in a row to provide an effective conditioning field, a tubular filter element contained within the bottom section of the housing and surrounding the magnetic conditioning assembly, said filter element being co-axial with the magnetic conditioning assembly and extending substantially along the entire length of the assembly, and baffle means disposed within the bottom section of the housing and including a solid cylindrical wall element which surrounds the row of magnets of the magnetic conditioning assembly, is generally parallel to the longitudinal axis of the housing, and has an opening at one end thereof upstream of the effective conditioning field and said baffle means directing the flow of fluid past the assembly so that the fluid flows generally parallel to the longitudinal axis of the assembly between the tubular member and the wall element of the baffle means.

7. The device of claim 6 wherein the wall element surrounds both the magnetic conditioning assembly and filter element.

8. The device of claim 6 wherein the cylindrical wall element only surrounds the magnetic conditioning assembly, with the filter element being external to the cylindrical wall element.

* * * * *